(12) United States Patent
Takada et al.

(10) Patent No.: US 10,626,272 B2
(45) Date of Patent: Apr. 21, 2020

(54) METHOD FOR PRODUCING SEMI-IPN COMPOSITE AND METHOD FOR PRODUCING MOISTURE-PERMEABLE FILM

(71) Applicant: DIC Corporation, Tokyo (JP)

(72) Inventors: Tetsuo Takada, Chiba (JP); Kunihiko Komatsuzaki, Osaka (JP); Kyouichi Toyomura, Tokyo (JP)

(73) Assignee: DIC CORPORATION, Tokyo (JP)

( * ) Notice: Subject to any disclaimer, the term of this patent is extended or adjusted under 35 U.S.C. 154(b) by 183 days.

(21) Appl. No.: 15/774,924

(22) PCT Filed: Oct. 20, 2016

(86) PCT No.: PCT/JP2016/081063
§ 371 (c)(1),
(2) Date: May 9, 2018

(87) PCT Pub. No.: WO2017/082009
PCT Pub. Date: May 18, 2017

(65) Prior Publication Data
US 2018/0334565 A1    Nov. 22, 2018

(30) Foreign Application Priority Data

Nov. 11, 2015  (JP) ................................ 2015-221296

(51) Int. Cl.
| | | |
|---|---|---|
| C08L 75/06 | (2006.01) | |
| C08F 283/00 | (2006.01) | |
| C08F 2/44 | (2006.01) | |
| C09D 151/08 | (2006.01) | |
| C08L 75/04 | (2006.01) | |
| C08L 75/08 | (2006.01) | |

(52) U.S. Cl.
CPC ................ *C08L 75/06* (2013.01); *C08F 2/44* (2013.01); *C08F 283/006* (2013.01); *C08L 75/04* (2013.01); *C08L 75/08* (2013.01); *C09D 151/08* (2013.01)

(58) Field of Classification Search
CPC ........ C08F 2/44; C08F 220/26; C08F 220/56; C08F 283/006; C08J 5/18; C08L 51/08; C08L 75/04; C08L 75/06; C08L 75/08; C08L 2205/04; C09D 151/08
See application file for complete search history.

(56) References Cited

U.S. PATENT DOCUMENTS

| 5,328,957 A | 7/1994 | Sorathia et al. |
|---|---|---|
| 2010/0010114 A1* | 1/2010 | Myung ................ C08G 18/831 523/114 |
| 2011/0287242 A1 | 11/2011 | Kanagawa et al. |

FOREIGN PATENT DOCUMENTS

| DE | 43 15 269 A1 | 11/1994 |
|---|---|---|
| EP | 2 248 845 A1 | 11/2010 |
| JP | 2005-264152 A | 9/2005 |
| JP | 2011-527377 A | 10/2011 |
| JP | 2013-231097 A | 11/2013 |
| JP | 2014-030863 A | 2/2014 |
| JP | 2015-086366 A | 5/2015 |
| KR | 10-2010-0119744 A | 11/2010 |

OTHER PUBLICATIONS

Mishra, et al., "Long-term in vitro hydrolytic stability of thermoplastic polyurethanes", Journal of Biomedical Research Part A, 103A, 3798-3806, Jul. 1, 2015. (Year: 2015).*
International Search Report issued in corresponding International Patent Application No. PCT/JP2016/081063, dated Nov. 29, 2016.
Korean Office Action issued in corresponding Korean Patent Application No. 10-2018-7011954, dated Mar. 4, 2019, with English Translation.
Extended European Search Report issued in corresponding European Patent Application No. 16863973.0-1102, dated May 31, 2019.

* cited by examiner

*Primary Examiner* — Christopher M Rodd
(74) *Attorney, Agent, or Firm* — McDermott Will & Emery LLP

(57) ABSTRACT

The present invention relates to a method for producing a semi-IPN composite, the method including polymerizing a hydrophilic monofunctional acrylate (b1) and a polyfunctional acrylate (b2) in a solution of a polyurethane (A) prepared using an aromatic polyisocyanate as a raw material. The present invention also relates to a method for producing a moisture-permeable film that is obtained by drying the semi-IPN composite obtained by the above production method. One object of the present invention is to provide a method for producing a semi-IPN composite excellent in moisture permeability, water-swelling resistance, and stain resistance. The semi-INP composite obtained by the production method of the present invention is excellent in moisture permeability, water-swelling resistance, and stain resistance. Therefore, the semi-IPN composite can be preferably used for moisture-permeable waterproof fabrics for clothing, medical, and sanitary use and for skin and topcoat layers of synthetic leathers.

6 Claims, No Drawings

METHOD FOR PRODUCING SEMI-IPN COMPOSITE AND METHOD FOR PRODUCING MOISTURE-PERMEABLE FILM

CROSS REFERENCE

This application is the U.S. National Phase under 35 U.S.C. § 371 of International Application No. PCT/JP2016/081063, filed on Oct. 20, 2016, which claims the benefit of Japanese Application No. 2015-221296, filed on Nov. 11, 2015, the entire contents of each are hereby incorporated by reference.

TECHNICAL FIELD

The present invention relates to a method that allows production of a semi-IPN composite excellent in moisture permeability, water-swelling resistance, and stain resistance.

BACKGROUND ART

Polyurethane has good mechanical strength and elasticity, is therefore widely used in various applications such as coating agents, molding materials, paints, and optical films, and is actively studied as materials for moisture-permeable waterproof fabrics and synthetic leathers.

However, a synthetic leather coated with polyurethane is inferior in moisture permeability and has a drawback in that moisture persists during wearing of the polyurethane-coated synthetic leather. One method proposed to address the drawback is to subject a polyurethane resin solution to wet coagulation to form a porous body (see, for example, PTL 1). However, to perform the wet coagulation, a special device and a complicated processing process must be used.

One proposed easily processable way is a hydrophilic urethane film that is applicable to dry lamination (see, for example, PTL 2). However, since the technique for this hydrophilic urethane film uses highly water-absorbent polyoxyethylene glycol as a main component, a problem arises in that the film swells when in contact with water during actual use and undergoes a change in appearance or is separated from a substrate. Another problem with the hydrophilic urethane film is that its lightfastness, heat resistance, etc. are poor because the ether group concentration is high, and it is therefore difficult to use the film for furniture and vehicle applications that require durability.

CITATION LIST

Patent Literature

PTL 1: Japanese Unexamined Patent Application Publication No. 2014-30863
PTL 2: Japanese Unexamined Patent Application Publication No. 2005-264152

SUMMARY OF INVENTION

Technical Problem

It is an object of the present invention to provide a method for producing a semi-IPN composite excellent in moisture permeability, water-swelling resistance, and stain resistance.

Solution to Problem

The present invention relates to a method for producing a semi-IPN composite, the method including polymerizing a hydrophilic monofunctional acrylate (b1) and a polyfunctional acrylate (b2) in a solution of a polyurethane (A) prepared using an aromatic polyisocyanate as a raw material.

The present invention also relates to a method for producing a moisture-permeable film, the method including drying the semi-IPN composite obtained by the above production method to thereby obtain the moisture-permeable film.

Advantageous Effects of Invention

The semi-INP composite obtained by the production method of the present invention is excellent in moisture permeability, water-swelling resistance, and stain resistance. Therefore, the semi-IPN composite can be preferably used for moisture-permeable waterproof fabrics for clothing, medical, and sanitary use and for skin and topcoat layers of synthetic leathers.

DESCRIPTION OF EMBODIMENTS

In the semi-IPN composite production method of the present invention, it is essential that a hydrophilic monofunctional acrylate (b1) and a polyfunctional acrylate (b2) be polymerized in a solution of a polyurethane (A) prepared using an aromatic polyisocyanate as a raw material.

The semi-IPN (Interpenetrating Polymer Network) composite is a composite having a network structure in which a crosslinked polymer is embedded in a non-crosslinked polymer of a different type. With the above production method, a composite is formed in which the polymer of the hydrophilic monofunctional acrylate (b1) and the polyfunctional acrylate (b2) is entangled with the non-crosslinked polyurethane (A).

It is essential that the polyurethane (A) used be prepared using an aromatic polyisocyanate as a raw material. When a polyurethane prepared using an aliphatic or alicyclic polyisocyanate as a raw material is used instead of the polyurethane (A), the desired moisture permeability and water-swelling resistance cannot be obtained. The reason for this may be that surface segregation of an acrylic component forming a semi-IPN occurs.

Specifically, the polyurethane (A) used is a reaction product of a polyol and an aromatic polyisocyanate. In the present invention, the formation of the semi-IPN structure as a result of polymerization of the hydrophilic monofunctional acrylate (b1) and the polyfunctional acrylate (b2) allows the excellent moisture permeability, water-swelling resistance, and stain resistance to be obtained. Therefore, the type of the polyol can be freely designed according to other physical properties such as durability.

Examples of the polyol that can be used include polyether polyols, polycarbonate polyols, polyester polyols, polyacrylic polyols, polybutadiene polyols, and hydrogenated polybutadiene polyols. These polyols may be used alone or in combination of two or more.

The number average molecular weight of the polyol can be appropriately determined within the range of 500 to 8,000 according to the intended physical properties. The number average molecular weight of the polyol is a value measured by gel permeation chromatography (GPC) under the following conditions.

Measurement device: High performance GPC ("HLC-8220GPC" manufactured by TOSOH Corporation)
Columns: The following columns manufactured by TOSOH Corporation and connected in series are used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (refractive index detector)
Column temperature: 40° C.
Eluent: Tetrahydrofuran (THF)
Flow rate: 1.0 mL/minute
Injection amount: 100 µL (tetrahydrofuran solution with a sample concentration of 0.4% by mass)
Standard samples: The following polystyrene standards are used to produce a calibration curve.
(Polystyrene Standards)
"TSKgel standard polystyrene A-500" manufactured by TOSOH Corporation
"TSKgel standard polystyrene A-1000" manufactured by TOSOH Corporation
"TSKgel standard polystyrene A-2500" manufactured by TOSOH Corporation
"TSKgel standard polystyrene A-5000" manufactured by TOSOH Corporation
"TSKgel standard polystyrene F-1" manufactured by TOSOH Corporation
"TSKgel standard polystyrene F-2" manufactured by TOSOH Corporation
"TSKgel standard polystyrene F-4" manufactured by TOSOH Corporation
"TSKgel standard polystyrene F-10" manufactured by TOSOH Corporation
"TSKgel standard polystyrene F-20" manufactured by TOSOH Corporation
"TSKgel standard polystyrene F-40" manufactured by TOSOH Corporation
"TSKgel standard polystyrene F-80" manufactured by TOSOH Corporation
"TSKgel standard polystyrene F-128" manufactured by TOSOH Corporation
"TSKgel standard polystyrene F-288" manufactured by TOSOH Corporation
"TSKgel standard polystyrene F-550" manufactured by TOSOH Corporation If necessary, a chain extension agent having a number average molecular weight within the range of 50 to 450 may be used in combination with the polyol. The number average molecular weight of the chain extension agent is a value that is measured in the same manner as that for the number average molecular weight of the polyol.

Examples of the chain extension agent that can be used include: chain extension agents having a hydroxyl group such as ethylene glycol, diethylene lycol, triethylene glycol, propylene glycol, 1,3-propanediol, 1,3-butanediol, 1,4-butanediol, hexamethylene glycol, saccharose, methylene glycol, glycerin, sorbito, bisphenol A, 4,4'-dihydroxydiphenyl, 4,4'-dihydroxydiphenyl ether, 4,4'-dihydroxydiphenyl sulfone, hydrogenated bisphenol A, and hydroquinone; and chain extension agents having an amino group such as ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine, and triethylenetetramine. These chain extension agents may be used alone or in combination of two or more.

From the viewpoint of mechanical strength and texture, the amount of the chain extension agent used is preferably within the range of 0.1 to 30 parts by mass based on 100 parts by mass of the polyol.

Examples of the aromatic polyisocyanate that can be used include 1,3-phenylene diisocyanate, 1,4-phenylene diisocyanate, 1-methyl-2,4-phenylene diisocyanate, 1-methyl-2,6-phenylene diisocyanate, 1-methyl-2,5-phenylene diisocyanate, 1-methyl-3,5-phenylene diisocyanate, 1-ethyl-2,4-phenylene diisocyanate, 1-isopropyl-2,4-phenylene diisocyanate, 1,3-dimethyl-2,4-phenylene diisocyanate, 1,3-dimethyl-4,6-phenylene diisocyanate, 1,4-dimethyl-2,5-phenylene diisocyanate, diethylbenzene diisocyanate, diisopropylbenzene diisocyanate, 1-methyl-3,5-diethylbenzene diisocyanate, 3-methyl-1,5-diethylbenzene-2,4-diisocyanate, 1,3,5-triethylbenzene-2,4-diisocyanate, naphthalene-1,4-diisocyanate, naphthalene-1,5-diisocyanate, 1-methyl-naphthalene-1,5-diisocyanate, naphthalene-2,6-diisocyanate, naphthalene-2,7-diisocyanate, 1,1-dinaphthyl-2,2'-diisocyanate, biphenyl-2,4'-diisocyanate, biphenyl-4,4'-diisocyanate, 3-3'-dimethylbiphenyl-4,4'-diisocyanate, 4,4'-diphenylmethane diisocyanate, 2,2'-diphenylmethane diisocyanate, and diphenylmethane-2,4-diisocyanate. These aromatic polyisocyanates may be used alone or in combination of two or more.

If necessary, an additional polyisocyanate may be used in combination with the above aromatic polyisocyanate. In this case, the content of the aromatic polyisocyanate is preferably 50% by mass or more and more preferably 80% by mass or more based on the total mass of the polyisocyanates used.

Examples of the additional polyisocyanate that can be used include aliphatic and alicyclic polyisocyanates such as tetramethylene diisocyanate, 1,6-hexamethylene diisocyanate, dodecamethylene diisocyanate, trimethylhexamethylene diisocyanate, 1,3-cyclopentylene diisocyanate, 1,3-cyclohexylene diisocyanate, 1,4-cyclohexylene diisocyanate, 1,3-di(isocyanatomethyl)cyclohexane, 1,4-di(isocyanatomethyl)cyclohexane, lysine diisocyanate, isophorone diisocyanate, 4,4'-dicyclohexylmethane diisocyanate, 2,4'-dicyclohexylmethane diisocyanate, 2,2'-dicyclohexylmethane diisocyanate, and 3,3'-dimethyl-4,4'-dicyclohexylmethane diisocyanate. These polyisocyanates may be used alone or in combination of two or more.

Examples of the method for producing the polyurethane (A) include a method in which the polyol, the aromatic polyisocyanate, an organic solvent, and, optionally, the chain extension agent are prepared and subjected to a urethanization reaction to thereby produce a solution of the polyurethane (A). Preferably, the reaction is performed, for example, at a temperature of 50 to 100° C. for 3 to 10 hours.

Examples of the organic solvent that can be used include N,N-dimethylformamide, N,N-dimethylacetamide, N-methyl-2-pyrrolidone, methyl ethyl ketone, methyl-n-propyl ketone, acetone, methyl isobutyl ketone, methyl formate, ethyl formate, propyl formate, methyl acetate, ethyl acetate, isopropyl acetate, isobutyl acetate, isobutyl acetate, secondary-butyl acetate, methanol, ethanol, isopropyl alcohol, and butanol. These organic solvents may be used alone or in combination of two or more. The amount of the organic solvent used is preferably within the range of 10 to 1,000 parts by mass and more preferably within the range of 20 to 600 parts by mass based on 100 parts by mass of the polyurethane (A).

From the viewpoint of production stability and mechanical strength, the ratio of the moles of isocyanate groups included in the aromatic polyisocyanate to the total moles of hydroxyl groups and amino groups in the polyol and the chain extension agent [isocyanate groups/hydroxyl groups and amino groups] is preferably within the range of 0.8 to 1.2 and more preferably within the range of 0.9 to 1.1.

The weight average molecular weight of the polyurethane (A) can be appropriately determined within the range of 500 to 500,000 according to the intended physical properties. The weight average molecular weight of the polyurethane (A) is a value measured in the same manner as that for the number average molecular weight of the polyol.

Next, the hydrophilic monofunctional acrylate (b1) and the polyfunctional acrylate (b2) will be described. In the present invention, it is essential to use the hydrophilic monofunctional acrylate (b1) and the polyfunctional acrylate (b2) in order to obtain excellent moisture permeability and stain resistance. The hydrophilic monofunctional acrylate (b1) can impart moisture permeability and water-swelling resistance and allows a coating to have hydrophilicity that provides stain resistance. The polyfunctional acrylate (b2) allows a semi-IPN structure to be formed, so that the moisture permeability, the water-swelling resistance, and the stain resistance can be further improved. The formation of the semi-IPN structure can prevent the hydrophilic component from shedding off the coating even during actual continuous use. This allows the strength of the coating and its moisture permeability to be maintained for a long time.

The "hydrophilicity" of the hydrophilic monofunctional acrylate (b1) means affinity for water and specifically means a solubility in 100 g of water (20° C.) of preferably 5% by mass or more, more preferably 10% by mass or more, and still more preferably 20% by mass or more. The "monofunctional" in the (b1) means that the (b1) has one (meth) acryloyl group.

Examples of the hydrophilic monofunctional acrylate (b1) that can be used include an amido group-containing acrylic monomer (b1-1), an oxyethylene group-containing acrylic monomer (b1-2), a sulfonic acid group-containing acrylic monomer, a quaternary ammonium group-containing acrylic monomer, a carboxyl group-containing acrylic monomer, an amino group-containing acrylic monomer, a cyano group-containing acrylic monomer, a hydroxyl group-containing acrylic monomer, an imido group-containing acrylic monomer, and a methoxy group-containing acrylic monomer.

Examples of the amido group-containing acrylic monomer (b1-1) that can be used include (meth)acrylamide, (meth)acryloylmorpholine, N-methylol(meth)acrylamide, N-methoxyethyl(meth)acrylamide, N,N-dimethylacrylamide, N,N-diethylacrylamide, and N-isopropylacrylamide. These monomers may be used alone or in combination of two or more.

Examples of the oxyethylene group-containing acrylic monomer (b1-2) that can be used include polyethylene glycol (meth)acrylate and methoxypolyethylene glycol (meth)acrylate. These monomers may be used alone or in combination of two or more.

Examples of the sulfonic acid group-containing acrylic monomer that can be used include sodium sulfopropyl (meth)acrylate, sodium 2-sulfoethyl (meth)acrylate, and sodium 2-acrylamide-2-methylpropane sulfonate. These monomers may be used alone or in combination of two or more.

Examples of the quaternary ammonium group-containing acrylic monomer that can be used include tetrabutylammonium (meth)acrylate and trimethylbenzylammonium (meth) acrylate. These monomers may be used alone or in combination of two or more.

Examples of the carboxyl group-containing acrylic monomer that can be used include (meth)acrylic acid, propyl (meth)acrylic acid, isopropyl (meth)acrylic acid, crotonic acid, and fumaric acid. These monomers may be used alone or in combination of two or more.

Examples of the amino group-containing acrylic monomer that can be used include dimethylaminoethyl (meth) acrylate, diethylaminoethyl (meth)acrylate, N-tert-butylaminoethyl (meth)acrylate, and methacryloxyethyltrimethylammonium chloride (meth) acrylate. These monomers may be used alone or in combination of two or more.

Examples of the cyano group-containing acrylic monomer that can be used include acrylonitrile, cyanomethyl acrylate, 2-cyanoethyl acrylate, cyanopropyl acrylate, 1-cyanomethylethyl acrylate, 2-cyanopropyl acrylate, 1-cyanocyclopropyl acrylate, 1-cyanocycloheptyl acrylate, 1,1-dicyanoethyl acrylate, 2-cyanophenyl acrylate, 3-cyanophenyl acrylate, 4-cyanophenyl acrylate, 3-cyanobenzyl acrylate, and 4-cyanobenzyl acrylate. These monomers may be used alone or in combination of two or more.

Examples of the hydroxyl group-containing acrylic monomer that can be used include 2-hydroxyethyl (meth) acrylate, 2-hydroxypropyl (meth)acrylate, 2-hydroxybutyl (meth)acrylate, 4-hydroxybutyl (meth)acrylate, and glycerol mono(meth)acrylate. These monomers may be used alone or in combination of two or more.

Examples of the imido group-containing acrylic monomer that can be used include (meth)acrylic imide, N-methylolmaleimide, N-hydroxyethylmaleimide, N-glycidylmaleimide, N-4-chloromethylphenylmaleimide, and N-acetoxyethylmaleimide. These monomers may be used alone or in combination of two or more.

Examples of the methoxy group-containing acrylic monomer that can be used include 3-methoxybutyl (meth)acrylate), 2-methoxyethyl (meth)acrylate, 3-methoxypropyl (meth)acrylate, and 2-methoxybutyl (meth)acrylate. These monomers may be used alone or in combination of two or more.

Among the above monomers, the amido group-containing acrylic monomer (b1-1) and the oxyethylene group-containing acrylic monomer (b1-2) are preferably used as the hydrophilic monofunctional acrylate (b1) because they have a highly hydrophilic amido group having an alkyl-substituted nitrogen atom or polyoxyethylene glycol in their side chain and therefore excellent moisture permeability and stain resistance are obtained. The total amount of the amido group-containing acrylic monomer (b1-1) and the oxyethylene group-containing acrylic monomer (b1-2) in the hydrophilic monofunctional acrylate (b1) is preferably 70% by mass or more, more preferably 80% by mass or more, and still more preferably 90% by mass or more.

The average number of moles of oxyethylene groups added to the oxyethylene group-containing acrylic monomer (b1-2) is preferably within the range of 5 to 13 moles and more preferably within the range of 8 to 10 moles from the viewpoint that the strength of the coating and its moisture permeability can be maintained for a long time.

Examples of the polyfunctional acrylate (b2) that can be used include ethylene glycol di(meth)acrylate, propylene glycol di(meth)acrylate, tetramethylene glycol di(meth)acrylate, trimethylolpropane di(meth)acrylate, polyethylene glycol di(meth)acrylate, hexamethylene glycol di(meth)acrylate, 1,6-hexanediol di(meth)acrylate, 1,9-nonanediol di(meth)acrylate, 1,10-decanediol di(meth)acrylate, ethoxylated bisphenol A di(meth)acrylate, propoxylated ethoxylated bisphenol A di(meth)acrylate, tricyclodecane dimethanol diacrylate, dipropylene glycol di(meth)acrylate, tripropylene glycol di(meth)acrylate, polypropylene glycol di(meth)acrylate, polytetramethylene glycol di(meth)acrylate, trimethylolpropane tri(meth)acrylate, pentaerythritol di(meth)acrylate, pentaerythritol tri(meth)acrylate, pentaerythritol tetra(meth)acrylate, di(trimethylolpropane) di(meth)acrylate, di(trimethylolpropane) tri(meth)acrylate, di(trimethylolpropane) tetra(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, and tris(2-(meth)acryloyloxyethyl)isocyanurate. The "polyfunctional" means that at least two (meth)acryloyl groups are present and preferably means that 2 to 3 (meth)acryloyl groups are present.

Among the above acrylates, oxyalkylene group-containing acrylates are preferable as the polyfunctional acrylate (b2) because their amorphism allows excellent compatibility with the polyurethane (A) and flexibility to be obtained, and oxypropylene group-containing acrylates are more preferable.

The average number of moles of oxyalkylene groups added to the polyfunctional acrylate (b2) is preferably within the range of 2 to 10 moles and more preferably within the range of 2 to 4 moles from the viewpoint of compatibility with the polyurethane (A).

The polymerization ratio (molar ratio) of the hydrophilic monofunctional acrylate (b1) to the polyfunctional acrylate (b2) is preferably within the range of 99.5/0.5 to 90/10 and more preferably within the range of 99/1 to 95/5 because high moisture permeability, high water-swelling resistance, and high stain resistance can be achieved simultaneously.

The polymerization ratio (molar ratio) between the amido group-containing acrylic monomer (b1-1), the oxyethylene group-containing acrylic monomer (b1-2), and the polyfunctional acrylate (b2) is preferably within the range of (b1-1)/(b1-2)/(b2)=50/49.5/0.5 to 89/1/10 and more preferably within the range of 70/29/1 to 88/7/5 because high moisture permeability and high stain resistance can be maintained.

The total amount of the hydrophilic monofunctional acrylate (b1) and the polyfunctional acrylate (b2) is preferably within the range of 10 to 70 parts by mass and more preferably within the range of 20 to 40 parts by mass based on 100 parts by mass of the polyurethane (A) because high moisture permeability, high water-swelling resistance, and high stain resistance can be achieved simultaneously.

If necessary, an additional radical polymerizable monomer may be used in combination with the hydrophilic monofunctional acrylate (b1) and the polyfunctional acrylate (b2).

Examples of the additional radical polymerizable monomer that can be used include: aliphatic (meth)acrylates such as methyl (meth)acrylate, ethyl (meth)acrylate, propyl (meth)acrylate, isopropyl (meth)acrylate, butyl (meth)acrylate, sec-butyl (meth)acrylate, isobutyl (meth)acrylate, 2-ethylbutyl (meth)acrylate, n-pentyl (meth)acrylate, hexyl (meth)acrylate, 2-ethylhexyl (meth)acrylate, heptyl (meth)acrylate, n-octyl (meth)acrylate, nonyl (meth)acrylate, dodecyl (meth)acrylate, 3-methylbutyl (meth)acrylate, isooctyl (meth)acrylate, lauryl (meth)acrylate, tridecyl (meth)acrylate, stearyl (meth)acrylate, isostearyl (meth)acrylate, neopentyl (meth)acrylate, hexadecyl (meth)acrylate, and isoamyl (meth)acrylate; alicyclic (meth)acrylates such as isobornyl (meth)acrylate, cyclohexyl (meth)acrylate, and tetrahydrofurfuryl (meth)acrylate; aromatic (meth)acrylates such as benzyl (meth)acrylate, benzyl (meth)acrylate, phenoxyethyl (meth)acrylate, and phenyl (meth)acrylate; and vinyl compounds such as styrene, α-methylstyrene, chlorostyrene, chloromethylstyrene, methyl vinyl ether, ethyl vinyl ether, and isobutyl vinyl ether. These monomers may be used alone or in combination of two or more.

A well-known radical polymerization method can be used to polymerize the hydrophilic monofunctional acrylate (b1) and the polyfunctional acrylate (b2). In one exemplary method, the hydrophilic monofunctional acrylate (b1), the polyfunctional acrylate (b2), a polymerization initiator, the optional additional radical polymerizable monomer, and an optional organic solvent are added to the solution of the polyurethane (A) and mixed and stirred or left to stand at a temperature within the range of, for example, 40 to 90° C. to allow radical polymerization to proceed for, for example, 1 to 20 hours.

Examples of the polymerization initiator that can be used include: peroxides such as hydrogen peroxide, potassium persulfate, sodium persulfate, and ammonium persulfate; organic peroxides such as benzoyl peroxide, t-butylperoxy-2-ethylhexanoate, and cumene hydroperoxide; and azo compounds such as 2,2'-azobis-(2-aminodipropane)dihydrochloride, 2,2'-azobis-(N,N'-dimethyleneisobutylamidine) dihydrochloride, azobisisobutyronitrile, 2,2'-azobis(2-methylbutyronitrile), and 2,2'-azobis(2,4-dimethylvaleronitrile). These polymerization initiators may be used alone or in combination of two or more. The amount of the polymerization initiator used is, for example, within the range of 0.001 to 5 parts by mass based on 100 parts by mass of the hydrophilic acrylic monomer (b1) and the polyfunctional acrylate (b2).

When the semi-IPN composite obtained by the above method is used to produce a moisture-permeable film described later, additional additives may be used as needed.

Examples of the additional additives that can be used include a pigment, a flame retardant, a plasticizer, a softener, a stabilizer, a wax, an antifoaming agent, a dispersant, a penetrant, a surfactant, a filler, an antifungal agent, an antimicrobial agent, an ultraviolet absorber, an antioxidant, a weathering stabilizer, a fluorescent brightening agent, an anti-aging agent, and a thickener. These additives may be used alone or in combination of two or more.

Next, a method for producing a moisture-permeable film using the semi-IPN composite will be described.

Examples of the method for producing the moisture-permeable film include a method including applying the semi-IPN composite to a substrate and drying the applied semi-IPN composite at a temperature within the range of, for example, 40 to 150° C. for, for example, 1 to 30 minutes.

Examples of the substrate to which the semi-IPN composite is applied include: glass; release paper; plastic film; substrates formed from nonwoven fabric, woven fabric, and knitting; resin film; and paper. Examples of the material forming the substrate include: synthetic fibers such as polyester fibers, nylon fibers, acrylic fibers, polyurethane fibers, acetate fibers, rayon fibers, and polylactic acid fibers; cotton; hemp; silk; wool; and fiber blends thereof. When the substrate used is formed from nonwoven fabric, woven fabric, or knitting, the substrate is impregnated with the semi-IPN composite in a dry form. In the present invention, this state also is referred to as a film.

The surface of the substrate may be optionally subjected to treatment such as antistatic finishing, release treatment, water repellent finishing, water absorbent finishing, antimicrobial and deodorant finishing, antibacterial finishing, or UV blocking treatment.

Examples of the method for applying the semi-IPN composite to the surface of the substrate include a gravure coater method, a knife coater method, a pipe coater method, and a comma coater method.

The thickness of the moisture-permeable film can be determined according to its intended application and is within the range of, for example, 0.01 to 10 mm.

The semi-INP composite obtained by the production method of the present invention is excellent in moisture permeability, water-swelling resistance, and stain resistance. Therefore, the semi-IPN composite can be preferably used for moisture-permeable waterproof fabrics for clothing, medical, and sanitary use and for skin and topcoat layers of synthetic leathers.

When the moisture-permeable film is used to produce a moisture-permeable waterproof fabric, examples of the method for producing the moisture-permeable waterproof fabric include: a method including bonding the moisture-permeable film to a fabric using a well-known adhesive; and a method including applying the semi-IPN composite directly to a fabric and drying the applied semi-IPN composite. Examples of the fabric that can be used include fabrics obtained from: synthetic fibers such as polyester fibers, nylon fibers, acrylic fibers, polyurethane fibers, acetate fibers, rayon fibers, and polylactic acid fibers; cotton; hemp; silk; wool; and fiber blends thereof.

When the moisture-permeable film is used to produce a synthetic leather, examples of the method for producing the synthetic leather include a method including applying the semi-IPN composite to release paper, drying the applied semi-IPN composite, and bonding the obtained moisture-permeable film to an intermediate or skin layer using a well-known adhesive. Examples of the base fabric include fabrics obtained from: synthetic fibers such as polyester fibers, nylon fibers, acrylic fibers, polyurethane fibers, acetate fibers, rayon fibers, and polylactic acid fibers; cotton; hemp; silk; wool; and fiber blends thereof.

EXAMPLES

The present invention will next be described in more detail by way of Examples.

Example 1

A reactor equipped with a stirrer, a thermometer, and a nitrogen gas introduction tube was charged with 100 parts by mass of an N,N-dimethylformamide solution of a polyester-based urethane prepared using diphenylmethane diisocyanate as a raw material ("CRISVON MP-856" manufactured by DIC Corporation, solid content: 20% by mass, hereinafter abbreviated as "PEs-based Pu"), 2.37 parts by mass of N,N-dimethylacrylamide (hereinafter abbreviated as "DMAA"), 3.63 parts by mass of methoxypolyethylene glycol acrylate ("AM-90G" manufactured by Shin Nakamura Chemical Co., Ltd., average number of moles of oxyethylene groups added: 9 moles), and 0.54 parts by mass of tripropylene glycol diacrylate ("APG-200" manufactured by Shin Nakamura Chemical Co., Ltd.) (polymerization ratio (molar ratio) between DMAA/AM-90G/APG-200:71/24/5, all figures rounded to the nearest integer), and then an azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 2

A reactor equipped with a stirrer, a thermometer, and a nitrogen gas introduction tube was charged with 100 parts by mass of an N,N-dimethylformamide solution of a polyether-based urethane prepared using diphenylmethane diisocyanate as a raw material ("CRISVON UST-135" manufactured by DIC Corporation, solid content: 25% by mass, hereinafter abbreviated as "PEt-based Pu"), 2.97 parts by mass of DMAA, 4.53 parts by mass of AM-90G, and 0.68 parts by mass of APG-200 (polymerization ratio (molar ratio) between DMAA/AM-90G/APG-200:71/24/5, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 3

A reactor equipped with a stirrer, a thermometer, and a nitrogen gas introduction tube was charged with 100 parts by mass of an N,N-dimethylformamide solution of a polycarbonate-based urethane prepared using diphenylmethane diisocyanate as a raw material ("CRISVON S-705" manufactured by DIC Corporation, solid content: 30% by mass, hereinafter abbreviated as "PC-based Pu"), 3.56 parts by mass of DMAA, 5.44 parts by mass of AM-90G, and 0.81 parts by mass of APG-200 (polymerization ratio (molar ratio) between DMAA/AM-90G/APG-200:71/24/5, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 4

A reactor equipped with a stirrer, a thermometer, and a nitrogen gas introduction tube was charged with 100 parts by mass of the PEs-based Pu, 2.37 parts by mass of DMAA, 3.63 parts by mass of AM-90G, and 0.06 parts by mass of APG-200 (polymerization ratio (molar ratio) between DMAA/AM-90G/APG-200:74/25/1, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 5

A reactor equipped with a stirrer, a thermometer, and a nitrogen gas introduction tube was charged with 100 parts by mass of the PEs-based Pu, 3.96 parts by mass of DMAA, 6.04 parts by mass of AM-90G, and 0.9 parts by mass of APG-200 (polymerization ratio (molar ratio) between DMAA/AM-90G/APG-200:71/24/5, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 6

A reactor equipped with a stirrer, a thermometer, and a nitrogen gas introduction tube was charged with 100 parts by mass of the PEs-based Pu, 1.84 parts by mass of DMAA, 4.16 parts by mass of methoxypolyethylene glycol acrylate ("AM-130G" manufactured by Shin Nakamura Chemical Co., Ltd., average number of moles of oxyethylene groups added: 13 moles), and 0.42 parts by mass of APG-200 (polymerization ratio (molar ratio) between DMAA/AM-130G/APG-200:71/24/5, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 7

A reactor equipped with a stirrer, a thermometer, and a nitrogen gas introduction tube was charged with 100 parts by mass of the PEs-based Pu, 2.37 parts by mass of DMAA, 3.63 parts by mass of AM-90G, and 0.84 parts by mass of polypropylene glycol #400 diacrylate ("APG-400" manufactured by Shin Nakamura Chemical Co., Ltd., average number of moles of oxypropylene groups added: 7 moles) (polymerization ratio (molar ratio) between DMAA/AM-90G/APG-400:71/24/5, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Comparative Example 1

A reactor equipped with a stirrer, a thermometer, and a nitrogen gas introduction tube was charged with 100 parts by mass of an N,N-dimethylformamide solution of a polycarbonate-based urethane prepared using isophorone diisocyanate as a raw material ("CRISVON NY-393" manufactured by DIC Corporation, solid content: 25% by mass, hereinafter abbreviated as "aliphatic-based Pu"), 2.97 parts by mass of DMAA, 4.53 parts by mass of AM-90G, and 0.68 parts by mass of APG-200 (polymerization ratio (molar ratio) between DMAA/AM-90G/APG-200:71/24/5, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Comparative Example 2

The PEs-based Pu alone was subjected to the following evaluation tests.

Comparative Example 3

The PEt-based Pu alone was subjected to the following evaluation tests.

Comparative Example 4

The PC-based Pu alone was subjected to the following evaluation tests.

[Method for producing moisture-permeable film]

One of the above polyurethane solutions and the semi-IPN composites obtained in the Examples and Comparative Examples was applied to release paper to a dry thickness of 15 μm and dried at 70° C. for 2 minutes and then at 120° C. for 2 minutes using a dryer to thereby obtain a film.

[Method for Evaluating Moisture Permeability]

For each of the moisture-permeable films obtained, its moisture permeability (g/m$^2$/24 h) was measured according to method B-1 (potassium acetate method) of JIS L1099: 2012.

[Method for Evaluating Water-Swelling Resistance]

The moisture-permeable films and films obtained in the Examples and Comparative Examples were cut into a size of 2 cm (vertical length)×5 cm (horizontal length), and the cut pieces were used as test pieces. The test pieces obtained were immersed in ion exchanged water at 25° C. for 1 hour. Then the horizontal length of each of the moisture-permeable films and the films removed from the ion exchanged water was measured, and the ratio (%) of swelling was computed from the following formula (1).

Ratio (%) of swelling=length (cm) of moisture–permeable film or film after immersion–5 (cm)/5 (cm)×100  (1)

[Method for Evaluating Stain Resistance]

The surface of each of the moisture-permeable films obtained was dotted with ink blots using an oil-based ballpoint pen ("JIM-KNOCK oil-based" manufactured by ZEBRA Co. Ltd.). The resulting film was left to stand at room temperature for 10 minutes and then wiped with a water-wet tissue. The moisture-permeable film was evaluated as to whether or not the ink remained on the film as follows.

"Good": The ink was wiped off completely.
"Poor": The ink remained present.

TABLE 1

|  | Example 1 | Example 2 | Example 3 | Example 4 | Example 5 |
|---|---|---|---|---|---|
| Polyurethane (A) | PEs-based Pu | PEt-based Pu | PC-based Pu | PEs-based Pu | PEs-based Pu |
| Hydrophilic monofunctional acrylate (b1) |  |  |  |  |  |
| Amido group-containing acrylic monomer (b1-1) | DMAA | DMAA | DMAA | DMAA | DMAA |

TABLE 1-continued

|  | Example 1 | Example 2 | Example 3 | Example 4 | Example 5 |
|---|---|---|---|---|---|
| Oxyethylene group-containing acrylic monomer (b1-2) | AM-90G | AM-90G | AM-90G | AM-90G | AM-90G |
| Amount of (b1) used based on 100 parts by mass of (A) (parts by mass) | 30 | 30 | 30 | 30 | 50 |
| Polyfunctional acrylate (b2) | APG-200 | APG-200 | APG-200 | APG-200 | APG-200 |
| Amount of (b2) used based on 100 parts by mass of (A) (parts by mass) | 2.7 | 2.72 | 2.7 | 0.3 | 4.5 |
| Molar ratio ((b1-1)/(b1-2)/(b2)) | 71/24/5 | 71/24/5 | 71/24/5 | 74/25/1 | 71/24/5 |
| Evaluation of moisture permeability |  |  |  |  |  |
| Moisture permeability (g/m$^2$/24 h) | 25,760 | 38,850 | 19,800 | 26,000 | 59,000 |
| Water-swelling resistance Swelling ratio (%) | 0 | 0 | 0 | 0 | 4 |
| Evaluation of stain resistance | Good | Good | Good | Good | Good |

TABLE 2

|  | Example 6 | Example 7 | Comparative Example 1 | Comparative Example 2 | Comparative Example 3 | Comparative Example 4 |
|---|---|---|---|---|---|---|
| Polyurethane (A) | PEs-based Pu | PEs-based Pu | Aliphatic-based Pu | PEs-based Pu | PEt-based Pu | PC-based Pu |
| Hydrophilic monofunctional acrylate (b1) |  |  |  |  |  |  |
| Amido group-containing acrylic monomer (b1-1) | DMAA | DMAA | DMAA |  |  |  |
| Oxyethylene group-containing acrylic monomer (b1-2) | AM-130G | AM-90G | AM-90G |  |  |  |
| Amount of (b1) used based on 100 parts by mass of (A) (parts by mass) | 30 | 30 | 30 |  |  |  |
| Polyfunctional acrylate (b2) | APG-200 | APG-400 | APG-200 |  |  |  |
| Amount of (b2) used based on 100 parts by mass of (A) (parts by mass) | 2.1 | 4.2 | 2.72 |  |  |  |
| Molar ratio ((b1-1)/(b1-2)/(b2)) | 71/24/5 | 71/24/5 | 71/24/5 |  |  |  |
| Evaluation of moisture permeability |  |  |  |  |  |  |
| Moisture permeability (g/m$^2$/24 h) | 38,800 | 23200 | 3,920 | 2,150 | 8,250 | 350 |
| Water-swelling resistance Swelling ratio (%) | 2 | 0 | 0 | 0 | 0 | 0 |
| Evaluation of stain resistance | Good | Good | Good | Poor | Poor | Poor |

As can be seen, in Examples 1 to 7, each of which provides the moisture-permeable film of the present invention, excellent moisture permeability, water-swelling resistance, and stain resistance were obtained.

In Comparative Example 1, the aliphatic-based polyurethane was used, and the moisture permeability of the semi-IPN composite obtained was not good.

In Comparative Examples 2 to 4, the films were formed from commonly used polyurethanes, and therefore the moisture permeability and the stain resistance were poor.

The invention claimed is:

1. A method for producing a semi-IPN composite, the method comprising polymerizing a hydrophilic monofunctional acrylate (b1) and a polyfunctional acrylate (b2) in a solution of a polyurethane (A) prepared using an aromatic polyisocyanate as a raw material, wherein the hydrophilic monofunctional acrylate (b1) comprises an amido group-containing acrylic monomer (b1-1) and an oxyethylene group-containing acrylic monomer (b1-2), the polymerization ratio (molar ratio) between the amido group-containing acrylic monomer (b1-1), the oxyethylene group-containing acrylic monomer (b1-2), and the polyfunctional acrylate (b2) is within a range of (b1-1)/(b1-2)/(b2)=50/49.5/0.5 to 89/1/10.

2. The method for producing a semi-IPN composite according to claim 1, wherein the polyfunctional acrylate (b2) has an oxyalkylene group.

3. A method for producing a semi-IPN composite, the method comprising polymerizing a hydrophilic monofunctional acrylate (b1) and a polyfunctional acrylate (b2) in a solution of a polyurethane (A) prepared using an aromatic polyisocyanate as a raw material, wherein the total amount of the hydrophilic monofunctional acrylate (b1) and the polyfunctional acrylate (b2) is within a range of 10 to 70 parts by mass based on 100 parts by mass of the polyurethane (A).

4. A method for producing a moisture-permeable film, the method comprising drying a semi-IPN composite into a film, the semi-IPN composite being obtained by the method for producing according to claim 1.

5. The method for producing a semi-IPN composite according to claim 3, wherein the polyfunctional acrylate (b2) has an oxyalkylene group.

6. A method for producing a moisture-permeable film, the method comprising drying a semi-IPN composite into a film, the semi-IPN composite being obtained by the method for producing according to claim 3.

* * * * *